United States Patent
Izumi et al.

(10) Patent No.: US 8,817,578 B2
(45) Date of Patent: Aug. 26, 2014

(54) SONIC WAVE OUTPUT DEVICE, VOICE COMMUNICATION DEVICE, SONIC WAVE OUTPUT METHOD AND PROGRAM

(75) Inventors: Seiichi Izumi, Kanagawa (JP); Hiroyuki Fukada, Tokyo (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 12/636,107

(22) Filed: Dec. 11, 2009

(65) Prior Publication Data

US 2010/0157738 A1    Jun. 24, 2010

(30) Foreign Application Priority Data

Dec. 22, 2008 (JP) ................. P2008-326032

(51) Int. Cl.
*G01S 3/808* (2006.01)
(52) U.S. Cl.
CPC ............... *G01S 3/8083* (2013.01); *G01S 3/808* (2013.01)
USPC .......................................... 367/125; 367/129
(58) Field of Classification Search
USPC ............... 367/127–129, 125; 340/573.1, 574, 340/539, 825.49, 825.54
See application file for complete search history.

(56) References Cited

U.S. PATENT DOCUMENTS

| | | | | |
|---|---|---|---|---|
| 5,446,701 A | * | 8/1995 | Utke et al. | 367/118 |
| 5,528,232 A | * | 6/1996 | Verma et al. | 367/128 |
| 6,075,442 A | * | 6/2000 | Welch | 340/573.1 |
| 6,297,737 B1 | * | 10/2001 | Irvin | 340/539.1 |
| 2002/0067660 A1 | * | 6/2002 | Bokhour | 367/128 |
| 2005/0105394 A1 | * | 5/2005 | Lee | 367/128 |

FOREIGN PATENT DOCUMENTS

| | | |
|---|---|---|
| JP | 58-119293 | 7/1983 |
| JP | 7-87590 | 3/1995 |
| JP | 11-024684 | 1/1999 |
| JP | 11-145915 | 5/1999 |
| JP | 2003-337593 | 11/2003 |
| JP | 2004-147311 | 5/2004 |
| JP | 2006-023906 | 1/2006 |
| JP | 2006-279298 | 10/2006 |
| JP | 2008-205896 | 9/2008 |
| JP | 2008-241991 | 10/2008 |
| JP | 2008-247125 | 10/2008 |

* cited by examiner

*Primary Examiner* — Ian J Lobo
(74) *Attorney, Agent, or Firm* — Finnegan, Henderson, Farabow, Garrett & Dunner, L.L.P.

(57) ABSTRACT

There is provided a sonic wave output device comprising, a receiving unit to receive wireless signals transmitted from a certain signal source, a determination unit to determine a parameter value depending on a location of the signal source using the wireless signals received by the receiving unit and a sonic wave output unit to output sonic waves with directionality toward a direction of the signal source based on the parameter value.

11 Claims, 15 Drawing Sheets

SONIC WAVE OUTPUT DEVICE, VOICE COMMUNICATION DEVICE, SONIC WAVE OUTPUT METHOD AND PROGRAM

BACKGROUND OF THE INVENTION

1. Field of the Invention

The present invention relates to a sonic wave output device, a voice communication device, a sonic wave output method and a program.

2. Description of the Related Art

Various techniques for outputting sonic waves with directionality toward a listener of sound have been developed. For example, according to the technique disclosed in Japanese Unexamined Patent Application Publication No. S58-119293, ultrasonic waves generated by amplitude modulation of a sound signals are emitted to the air in order to obtain audible sound by a nonlinear parametric function. According to the technique disclosed in Japanese Unexamined Patent Application Publication No. H11-145915 or 2004-147311, ultrasonic waves generated by amplitude modulation of a sound signal are output from one of two speakers, and non-modulated ultrasonic waves are output from the other speaker, thereby generating a beat and providing a user with sound by the secondary component of the beat.

Further, Japanese Unexamined Patent Application Publication No. H7-87590 discloses a technique of detecting a user's location with use of an imaging device, a sensor or the like and optimizing directionality of sonic waves in the audible range.

SUMMARY OF THE INVENTION

However, the techniques disclosed in Japanese Unexamined Patent Application Publications Nos. S58-119293, H11-145915 and 2004-147311 are incapable of adjusting directionality in a manner adaptive to a target location. Therefore, their uses are limited to explanation of an article on exhibition or the like where a listener's location is predictable.

Further, in the technique disclosed in Japanese Unexamined Patent Application Publication No. H7-87590, it is necessary to go through a complicated procedure that involves mounting a microphone array in the position opposite to a speaker and determining directionality based on feedback from the microphone array and a previously defined coefficient. Furthermore, in this technique, it is necessary to set the layout each time because of constraints of the positional relationship between the speaker and the microphone array, which causes a limitation to uses.

In light of the foregoing, it is desirable to provide a novel and improved sonic wave output device, voice communication device, sonic wave output method and program capable of outputting sonic waves with directionality toward a target located in an arbitrary direction or place which is not limited in advance.

According to an embodiment of the present invention, there is provided a sonic wave output device including, a receiving unit to receive wireless signals transmitted from a certain signal source, a determination unit to determine a parameter value depending on a location of the signal source using the wireless signals received by the receiving unit and a sonic wave output unit to output sonic waves with directionality toward a direction of the signal source based on the parameter value.

The receiving unit may include a plurality of receiving antennas to receive the wireless signals and the sonic wave output unit may include a plurality of speakers, each capable of outputting a sonic wave with a certain amount of delay so that the determination unit may determine the amount of delay for each of the speakers according to an arrival time difference or a phase difference of the wireless signals between the receiving antennas.

The receiving unit may include a plurality of receiving antennas to receive the wireless signals so that the determination unit may determine arrival directions of the wireless signals according to an arrival time difference or a phase difference of the wireless signals between the receiving antennas.

The receiving unit may include three or more receiving antennas to receive the wireless signals, and the determination unit may determine a location of the signal source according to two or more arrival time differences or phase differences of the wireless signals between the receiving antennas.

The speakers of the sonic wave output unit may be respectively mounted in close proximity to the receiving antennas of the receiving unit, and the determination unit may determine the amount of delay for each of the speakers with inverting an order of arrival time or phase of the wireless signals of the receiving antennas The wireless signals may be beacons containing an identifier for identifying an individual piece of the signal source or a user holding the signal source, and the sonic wave output device may further include a control unit to control whether to output sonic waves from the sonic wave output unit according to the identifier contained in the beacons.

The sonic wave output device may further include a sound analysis unit to specify a user being a speaker of sound from known users based on the sound collected from a direction of the signal source.

The sonic wave output device may further include a control unit to control output of sonic waves from the sonic wave output unit according to whether a specific voice command is contained in sound collected from a direction of the signal source.

The receiving unit may include a plurality of photoreceptors to receive infrared rays as the wireless signals, and the determination unit may determine a location of the signal source according to a position of a photoreceptor having received the infrared ray.

According to another embodiment of the present invention, there is provided a voice communication device including, a receiving unit to receive wireless signals transmitted from a certain signal source, a determination unit to determine a parameter value depending on a location of the signal source using the wireless signals received by the receiving unit, a sonic wave output unit to output sonic waves with directionality toward a direction of the signal source based on the parameter value and a sound input unit to collect sound from a direction of the signal source based on the parameter value.

According to another embodiment of the present invention, there is provided a sonic wave output method including the steps of receiving wireless signals transmitted from a certain signal source, determining a parameter value depending on a location of the signal source using the received wireless signals and outputting sonic waves with directionality toward a direction of the signal source based on the parameter value.

According to another embodiment of the present invention, there is provided a program causing a computer for controlling a sonic wave output device including a receiving unit capable of receiving wireless signals transmitted from a certain signal source and speakers capable of outputting sonic waves to implement functions including a determination unit to determine a parameter value depending on a location of the signal source using the wireless signals received by the receiving unit and a sonic wave output unit to set directionality of sonic waves output from the speakers toward a direction of the signal source based on the parameter value.

According to the embodiments of the present invention described above, it is possible to provide the sonic wave output device, voice communication device, sonic wave output method and program capable of outputting sonic waves with directionality toward a target located in an arbitrary direction or place which is not limited in advance.

DETAILED DESCRIPTION OF THE EMBODIMENT(S)

Figure 1:
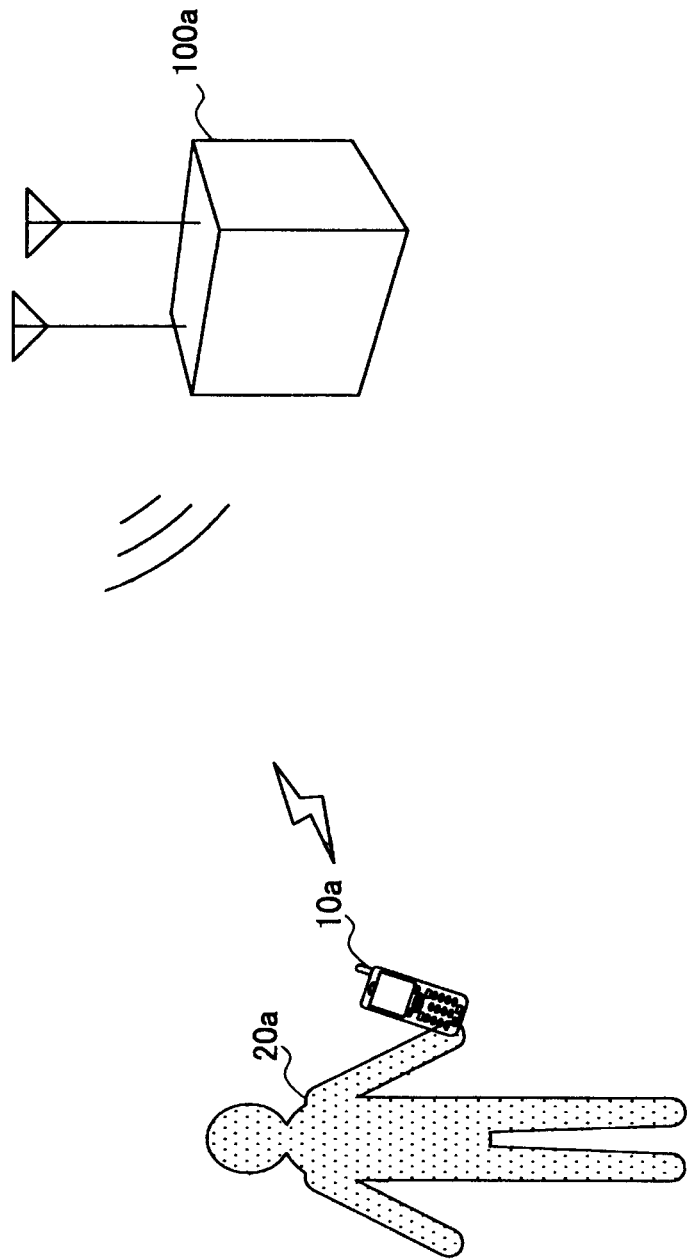
FIG. 1 is a schematic view showing a first example of a situation to use a sonic wave output device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Outline of Sonic Wave Output Device According to an Embodiment

2. Description of First Embodiment
3. Description of Second Embodiment
4. Description of Third Embodiment
5. Description of Fourth Embodiment
6. Summary 1. Outline of Sonic Wave Output Device According to an Embodiment An outline of a sonic wave output device according to an embodiment of the present invention is described hereinafter with reference to FIGS. 1 to 3.

FIG. 1 is a schematic view showing an example of a situation to use a sonic wave output device according to an embodiment. FIG. 1 shows a sonic wave output device 100a, and a signal source 10a and a user 20a located in the vicinity of the sonic wave output device 100a.

In the example of FIG. 1, the signal source 10a transmits a wireless signal to the nearby area, so that the sonic wave output device 100a which receives the wireless signal sets directionality of sonic waves to focus toward its location or direction. Although FIG. 1 shows a cellular phone terminal as an example of the signal source 10a, the signal source 10a is not limited to a cellular phone terminal. For example, the signal source 10a may be an information processing terminal such as a PC (Personal Computer) or PDA (Personal Digital Assistances), a game terminal, a dedicated wireless transmitter or the like.

The user 20a holds the signal source 10a and listens to sonic waves (or a sound signal modulated into sonic waves) that are output with directionality from the sonic wave output device 100a based on a wireless signal transmitted from the signal source 10a. Although FIG. 1 shows the case where the user 20a holds the signal source 10a with one hand, it is not limited thereto, and the user 20a may hold the signal source 10a in any manner. Further, the signal source 10a is not necessarily held by the user 20a as long as it is located in close proximity to the user 20a.

The sonic wave output device 100a outputs sonic waves having directionality oriented toward the location or direction of the signal source 10a based on a wireless signal transmitted from the signal source 10a, as described in detail later. The user 20a can thereby listen to the sonic waves that are output from the sonic wave output device 100a.

In this specification, a wireless signal includes a given signal such as electromagnetic waves, sonic waves, light or infrared rays, for example, which can be transmitted without through a physical line. Further, sonic waves include not only audible sound but also ultrasonic waves or the like having a frequency outside the audible range.

Figure 2:
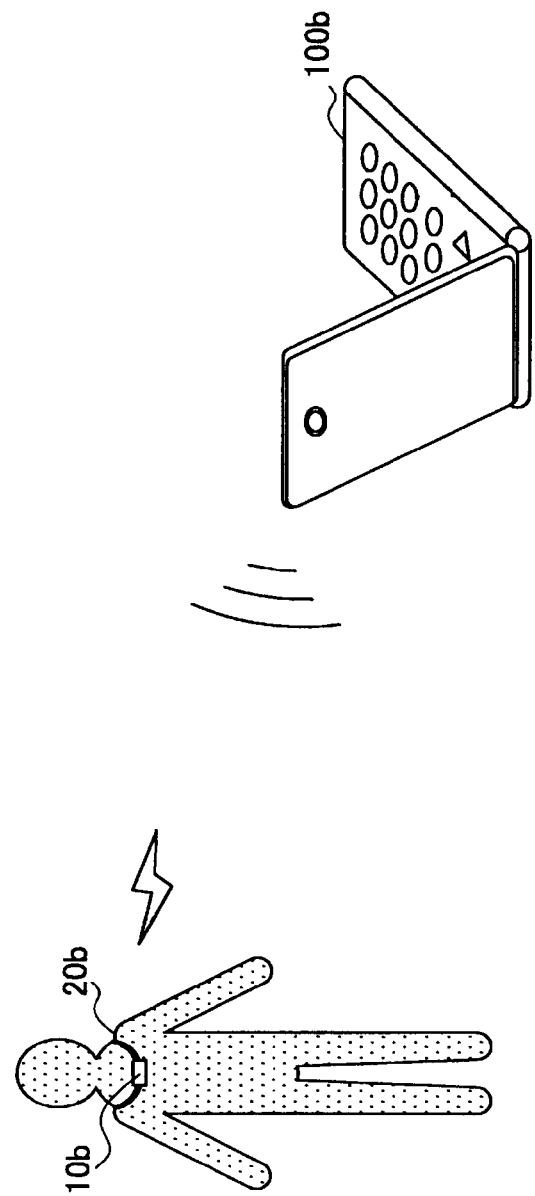
FIG. 2 is a schematic view showing a second example of a situation to use a sonic wave output device according to an embodiment.

FIG. 2 is a schematic view showing another example of a situation to use a sonic wave output device according to an embodiment. FIG. 2 shows a sonic wave output device 100b, and a signal source 10b and a user 20b located in the vicinity of the sonic wave output device 100b.

In the example of FIG. 2, the signal source 10b is illustrated as a wireless transmitter in an accessory shape which can be worn by the user 20b. On the other hand, the sonic wave output device 100b is illustrated as a cellular phone terminal.

In this case, like in the case of FIG. 1, the signal source 10b transmits a wireless signal to the nearby area, so that the sonic wave output device 100b which receives the wireless signal sets directionality of sonic waves to focus toward its location or direction. Then, the sonic wave output device 100b outputs sonic waves having directionality oriented toward the location or direction of the signal source 10b based on the wireless signal transmitted from the signal source 10b. The user 20b can thereby listen to the sonic waves that are output from the sonic wave output device 100b.

Figure 3:
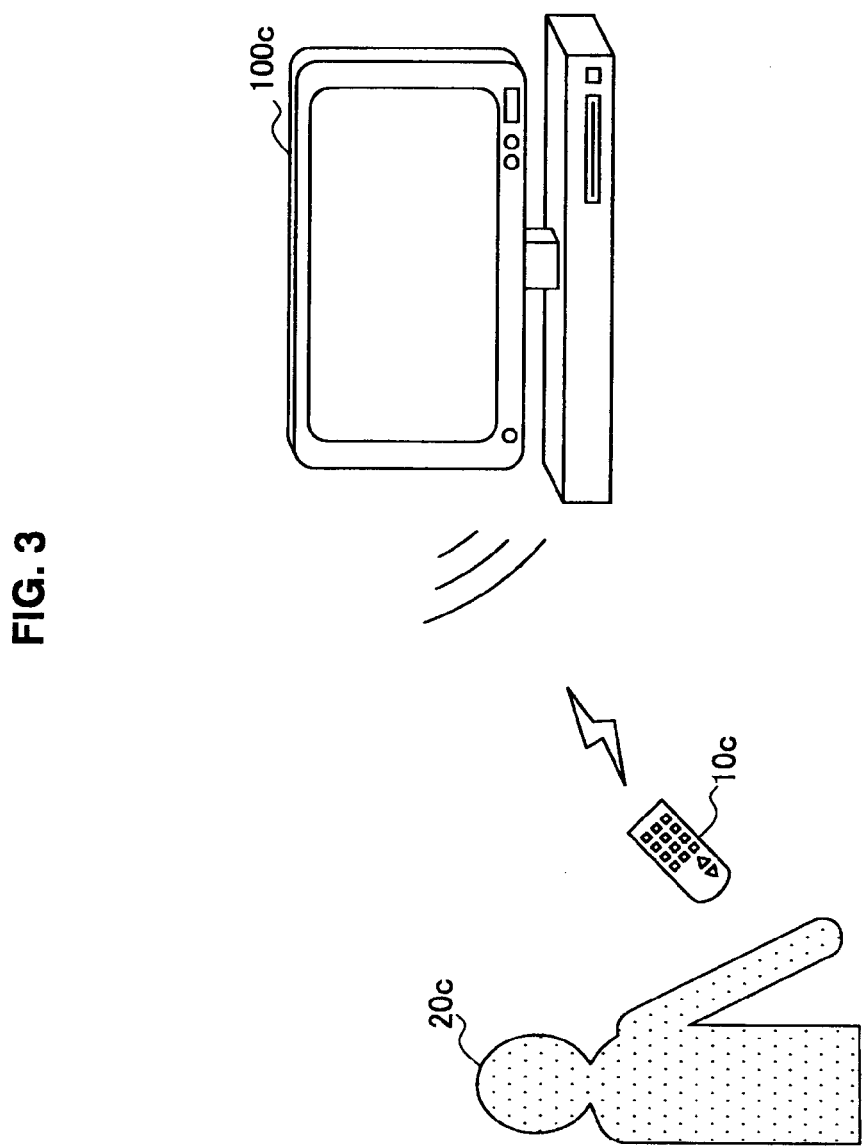
FIG. 3 is a schematic view showing a third example of a situation to use a sonic wave output device according to an embodiment.

FIG. 3 is a schematic view showing yet another example of a situation to use a sonic wave output device according to an embodiment. FIG. 3 shows a sonic wave output device 100c, and a signal source 10c and a user 20c located in the vicinity of the sonic wave output device 100c.

In the example of FIG. 3, the signal source 10c is illustrated as a remote control device for operating the sonic wave output device 100c. On the other hand, the sonic wave output device 100c is illustrated as a display device which is equivalent to a television set or the like.

In this case, like in the cases of FIGS. 1 and 2, the signal source 10c transmits a wireless signal to the nearby area, so that the sonic wave output device 100c which receives the wireless signal sets directionality of sonic waves to focus toward its location or direction. Then, the sonic wave output device 100c outputs sonic waves having directionality oriented toward the location or direction of the signal source 10c based on the wireless signal transmitted from the signal source 10c. The user 20c can thereby listen to the sonic waves that are output from the sonic wave output device 100c.

An outline of a sonic wave output device according to an embodiment of the present invention is described above with reference to FIGS. 1 to 3 with respect to examples of situations where the sonic wave output device is used. Hereinafter, four exemplary embodiments of such a sonic wave output device are described sequentially.

In the following description, the sonic wave output devices 100a, 100b and 100c are collectively referred to as the sonic wave output device 100, when there is no particular need to distinguish between them. This applies also to the signal sources 10a, 10b and 10c (the signal source 10) and the users 20a, 20b and 20c (the user 20).

2. Description of First Embodiment 2-1. Configuration of Sonic Wave Output Device FIG. 4 is a block diagram showing an example of a configuration of the sonic wave output device 100 according to a first embodiment of the present invention.

Figure 4:
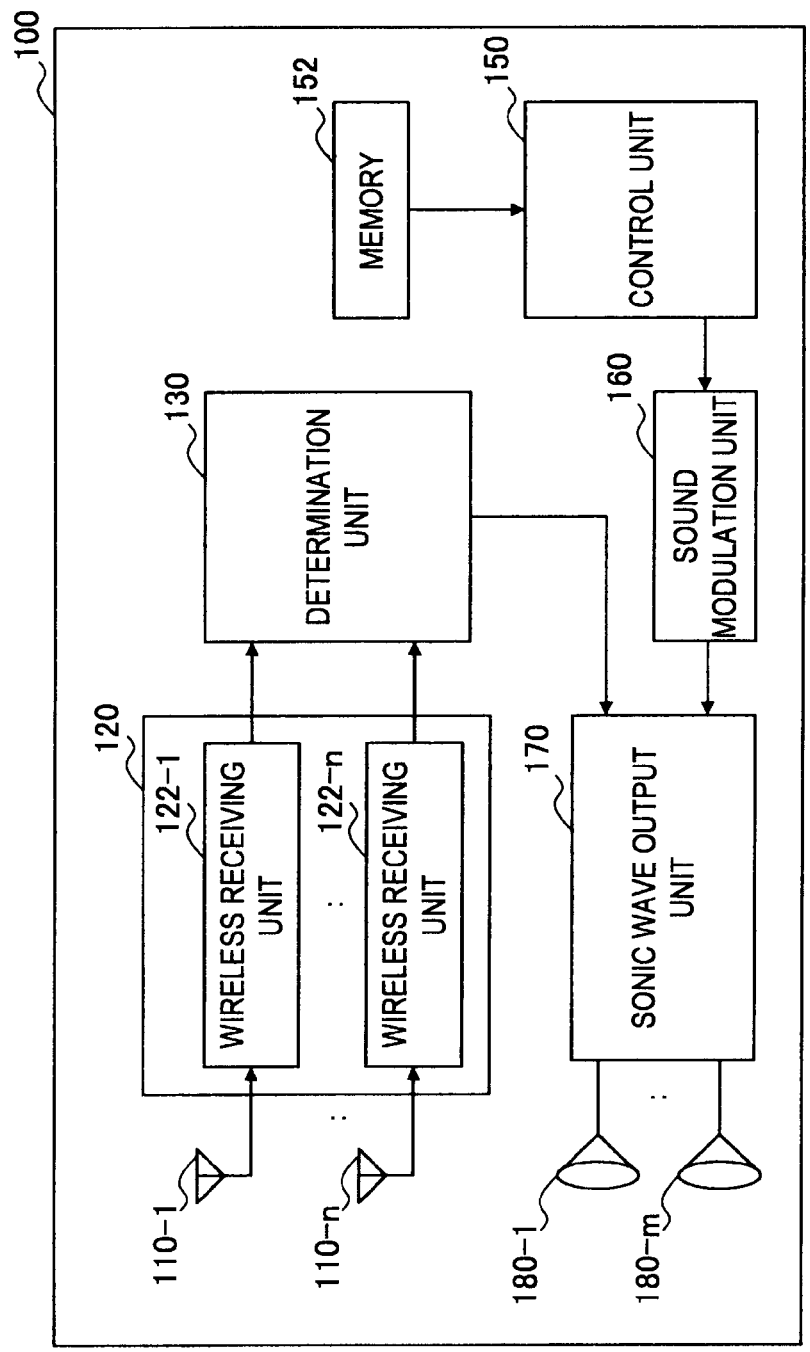
FIG. 4 is a block diagram showing an example of a configuration of a sonic wave output device according to a first embodiment.

Referring to FIG. 4, the sonic wave output device 100 includes n-number of receiving antennas 110-1 to 110-n ($n \geq 1$), a receiving unit 120, a determination unit 130, a control unit 150, memory 152, a sound modulation unit 160, a sonic wave output unit 170, and m-number of speakers 180-1 to 180-m ($m \geq 1$). The receiving unit 120 includes wireless receiving units 122-1 to 122-n respectively corresponding to the n-number of receiving antennas 110-1 to 110-n. By way of illustration, it is assumed that an electromagnetic signal is transmitted from the signal source 10 to the sonic wave output device 100, examples of which are shown in FIGS. 1 to 3.

In the receiving unit 120, the wireless receiving units 122-1 to 122-n receive wireless signals transmitted from the signal source 10 through the corresponding receiving antennas 110-1 to 110-n. Then, the respective wireless receiving units 122-1 to 122-n amplify the received signals, perform AD (Analog to Digital) conversion, and output the converted signals to the determination unit 130.

The determination unit 130 determines a certain parameter value that varies depending on the location of the signal source 10 based on the wireless signals that are received by the receiving unit 120 (which are referred to hereinafter as received signals). For example, the parameter value determined by the determination unit 130 may be arrival directions of wireless signals transmitted from the signal source 10. Alternatively, the parameter value determined by the determination unit 130 may be an actual location of the signal source 10, for example. Further, the parameter value determined by the determination unit 130 may be the amount of delay of sonic waves to be output to the signal source 10 with respect to each of the speakers 180-1 to 180-m, for example. The specific details of processing by the determination unit 130 are described later.

The control unit 150 executes a program stored in the memory 152 with use of a control device such as a CPU (Central Processing Unit) or an MPU (Micro Processing Unit), for example, and controls the operation of the sonic wave output device 100 as a whole. Specifically, the control unit 150 receives a request from an application (not shown) placed inside or outside the sonic wave output device 100, for example, acquires a sound signal to be provided to the user 20 and outputs it to the sound modulation unit 160. The memory 152 stores a program executed by the control unit 150, control data or the like with use of semiconductor memory such as ROM (Random Access memory), for example.

The sound modulation unit 160 modulates the sound signal input from the control unit 150 into an analog signal and outputs it to the sonic wave output unit 170.

The sonic wave output unit 170 outputs sonic waves having directionality oriented toward the direction of the signal source 10 from the speakers 180-1 to 180-m based on any of the above-described parameter values that is determined by the determination unit 130. For example, if arrival directions of wireless signals on a two-dimensional plane are input, the sonic wave output unit 170 may set directionality of the sonic waves to focus toward the input direction. For another example, if the location of the signal source 10 is input, the sonic wave output unit 170 may set directionality of the sonic waves to focus toward the input location. For yet another example, if the phase delay of sonic waves to be output to the signal source 10 for each of the speakers 180-1 to 180-m is input, the sonic wave output unit 170 may output sonic waves with a delay time corresponding to each phase delay from the respective speakers 180-1 to 180-m. The specific details of processing by the sonic wave output unit 170 are described later.

The speakers 180-1 to 180-m may be a plurality of speakers arranged in an array, each of which can output a sonic wave with a certain phase delay, for example. Alternatively, the speakers 180-1 to 180-m may be one speaker capable of mechanically changing the orientation of a vibrating surface that generates sonic waves, for example. Further, the speakers 180-1 to 180-m may be a speaker for ultrasonic wave output that generates audible sound at the location of the signal source 10 by an above-mentioned nonlinear parametric function, for example.

An example of a configuration of the sonic wave output device 100 according to the embodiment is described above with reference to FIG. 4. In the above-described configuration, typical patterns in which directionality of sonic waves that are output from the sonic wave output device 100 is controlled are specifically described hereinafter.

2-2. Example of Directionality Control 2-2-1. Control According to Arrival Direction In a first pattern of directionality control, directionality of sonic waves that are output from the sonic wave output device 100 is controlled according to arrival directions of wireless signals. In this case, the determination unit 130 determines arrival directions of wireless signals based on an arrival time difference or a phase difference of the wireless signals received by the receiving unit 120 between the receiving antennas 110-1 to 110-n.

Two examples of techniques for the determination unit 130 to obtain an arrival time difference of wireless signals are described firstly. As a first example, the determination unit 130 can calculate a correlation between signals input from the wireless receiving units 122-1 to 122-n, and obtain an arrival time difference of wireless signals between the receiving antennas 110-1 to 110-n from a position of a peak of the obtained correlation value, for example. As a second example, when impulse signals or signals having a known signal pattern are transmitted as beacon signals from the signal source 10, for example, the determination unit 130 can obtain the arrival time difference from a difference in absolute time at which the beacon signals are arrived.

Further, the determination unit 130 may obtain a phase difference of wireless signals rather than an arrival time difference of wireless signals. In this case, the determination unit 130 first extracts a frequency component of a known frequency that is contained in a beacon signal transmitted from the signal source 10 with respect to each of received signals that are input from the wireless receiving units 122-1 to 122-n. The determination unit 130 then calculates a correlation value of the received signals between the extracted frequency components and thereby obtains a phase difference of the wireless signals between the receiving antennas 110-1 to 110-n from phases of the calculated correlation values.

The determination unit 130 may obtain an arrival time difference or a phase difference of wireless signals between the receiving antennas 110-1 to 110-n by using a technique different from the above-described techniques.

Next, the determination unit 130 calculates a difference in path length to the signal source 10 between the receiving antennas 110-1 to 110-n from an arrival time difference or a phase difference of wireless signals between the receiving antennas 110-1 to 110-n. If an arrival time difference of wireless signals between the receiving antennas 110-1 to 110-n is τ and the speed of light is c, for example, a difference d in path length between the receiving antennas 110-1 to 110-n is given by the following expression.

Expression 1:

$$d = c\tau \quad (1)$$

Further, if a phase difference of wireless signals between the receiving antennas 110-1 to 110-n is φ and a wavelength of wireless signals is λ, for example, a difference d in path length between the receiving antennas 110-1 to 110-n is given by the following expression.

Expression 2

$$d = \frac{\phi}{2\pi} \cdot \lambda \quad (2)$$

Then, the determination unit 130 determines the arrival direction of the signal source 10 based on the difference d in path length between the receiving antennas 110-1 to 110-n which is calculated as described above.

Figure 5:
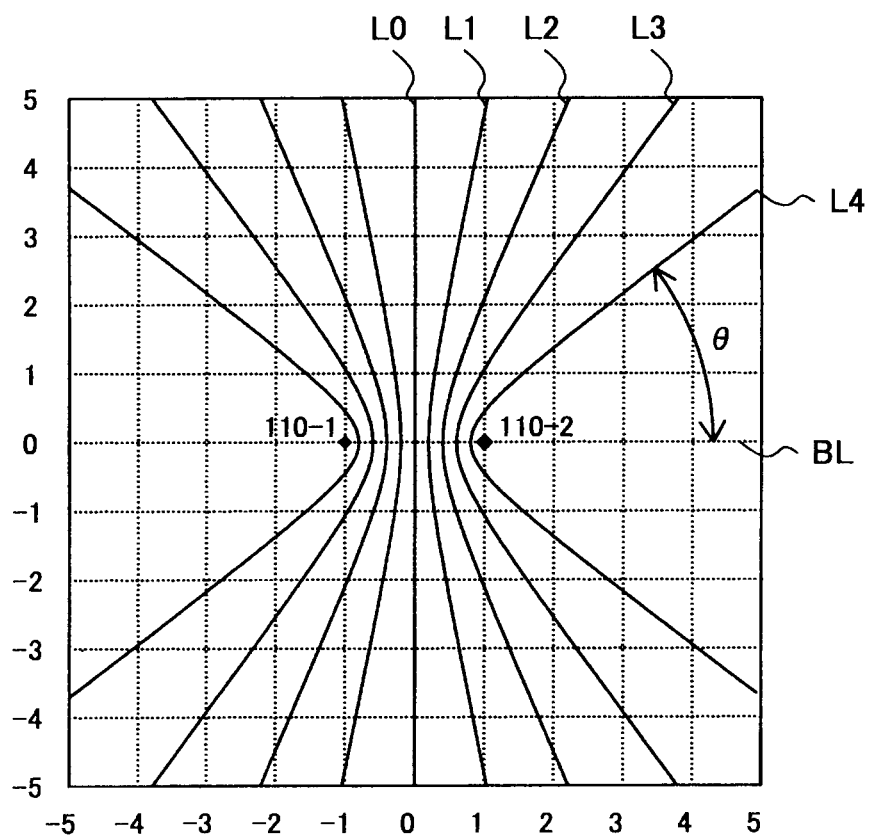
FIG. 5 is an explanatory view to describe processing of determining an arrival direction of a wireless signal.

FIG. 5 is an explanatory view to describe processing of determining the arrival direction of the signal source 10 from the difference d in path length between two receiving antennas 110-1 and 110-2 and an antenna interval r.

FIG. 5 shows a two-dimensional plane on which the receiving antenna 110-1 is located at coordinates (−1, 0) and the receiving antenna 110-2 is located at coordinates (1, 0). On such a two-dimensional plane, orbits L0, L1, L2, L3 and L4 of the location of the signal source 10 are plotted. The orbits L0, L1, L2, L3 and L4 are orbits when the above-described difference d in path length is 0%, 20%, 40%, 60% and 80%, respectively, of the antenna interval r, and they correspond to hyperbolic orbits (L0 corresponds to a straight line). If it is assumed that a distance between the signal source 10 and the sonic wave output device 100 is sufficiently larger than the antenna interval r, the hyperbola can be approximate to the straight line. Thus, the determination unit 130 determines an angle θ between the straight line approximate to the hyperbolic orbit and a base line BL of the two receiving antennas 110-1 and 110-2 as the arrival direction of the signal source 10.

As described above, if the receiving unit 120 has two receiving antennas that receive wireless signals, the determination unit 130 can determine arrival directions of the wireless signals transmitted from the signal source 10 on a two-dimensional plane. The determination unit 130 then outputs the determined arrival direction θ of the wireless signals to the sonic wave output unit 170.

Receiving the arrival direction θ of the wireless signals from the determination unit 130, the sonic wave output unit 170 outputs sonic waves with directionality oriented toward the arrival direction θ from the speakers 180-1 to 180-m.

Figure 6:
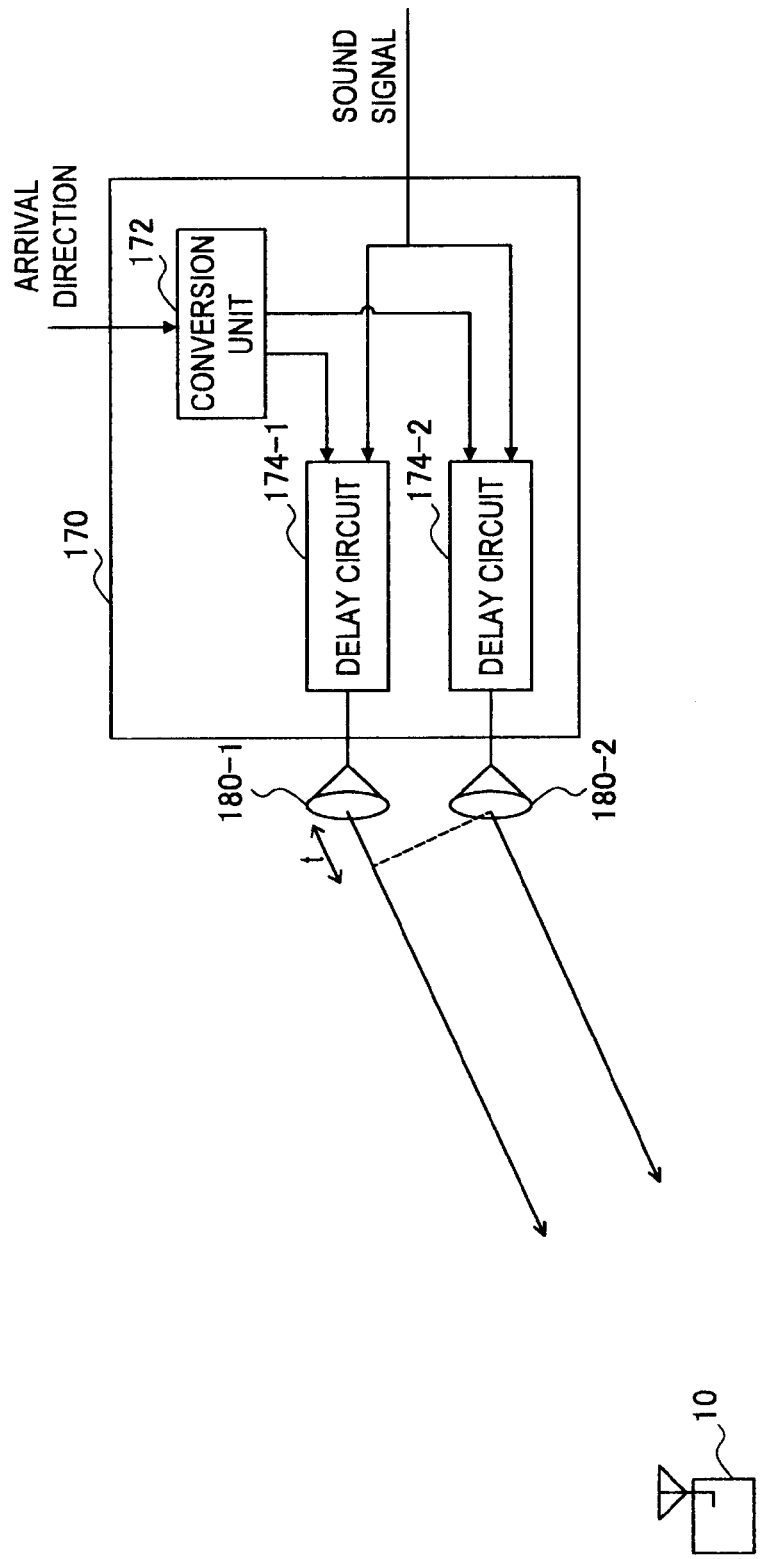
FIG. 6 is an explanatory view to describe control of directionality of sonic waves.

FIG. 6 is an explanatory view to describe control of directionality of sonic waves in the case where the sonic wave output unit 170 has two speakers 180-1 and 180-2 and each speaker can output a sonic wave with a certain phase delay.

Referring to FIG. 6, the sonic wave output unit 170 includes a conversion unit 172 and two delay circuits 174-1 and 174-2 respectively corresponding to the two speakers 180-1 and 180-2.

In the example of FIG. 6, the conversion unit 172 converts a value of the arrival direction θ that is input from the determination unit 130 into an amount of delay for each speaker and inputs the converted amounts of delay to the delay circuits 174-1 and 174-2, respectively. Then, the delay circuits 174-1 and 174-2 respectively delay a sound signal that is input from the sound modulation unit 160 according to the respective input amounts of delay and then output the delayed sound signals from the speakers 180-1 and 180-2, respectively. Specifically, in this case, sonic waves output from the speakers 180-1 and 180-2 are plane waves. However, by shifting the phases of the output plane waves from each other by means of the delay circuits 174-1 and 174-2, the wavefront of the sonic waves becomes orthogonal to the arrival direction of the wireless signals, so that directionality of the sonic waves can be oriented toward the arrival direction.

In the example of FIG. 6, the amount of delay of the sound signal in the delay circuit 174-1 is zero, and the amount of delay of the sound signal in the delay circuit 174-2 is t. The sound signal from the speaker 180-1 that is located farther from the signal source 10 is thereby output earlier, and directionality of the sonic waves is oriented toward the direction of the signal source 10.

Although the case where the sonic wave output unit 170 controls directionality of sonic waves with use of two speakers 180-1 and 180-2 is described above, a larger number of speakers may be used as a matter of course.

Figure 7:
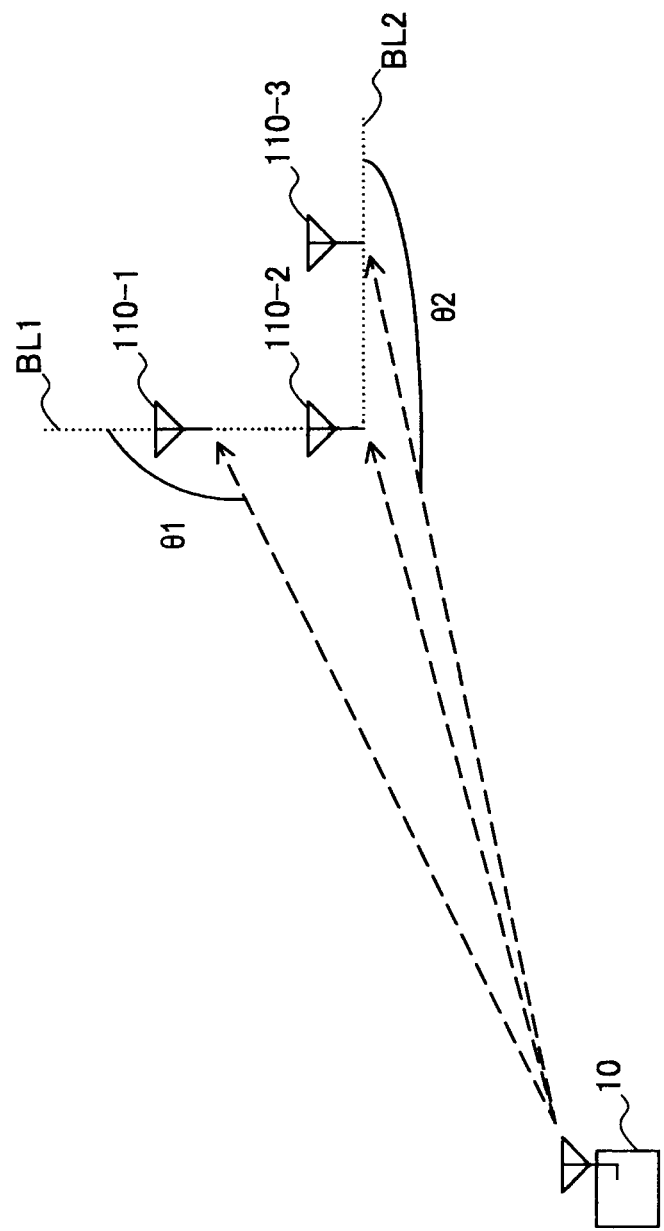
FIG. 7 is an explanatory view to describe processing of determining an arrival direction of a wireless signal in a three-dimensional space.

Further, as shown in FIG. 7, three receiving antennas 110-1 to 110-3 may be mounted to the receiving unit 120, and the arrival directions of wireless signals from the signal source 10 may be specified in a three-dimensional space. Specifically, in this case, the determination unit 130 first determines an arrival direction θ1 of a wireless signal with respect to a base line BL1 of the receiving antennas 110-1 and 110-2 based on a difference in path length between the receiving antennas 110-1 to 110-2. Next, the determination unit 130 determines an arrival direction θ2 of a wireless signal with respect to a base line BL2 of the receiving antennas 110-2 and 110-3 based on a difference in path length between the receiving antennas 110-2 to 110-3.

Figure 8:
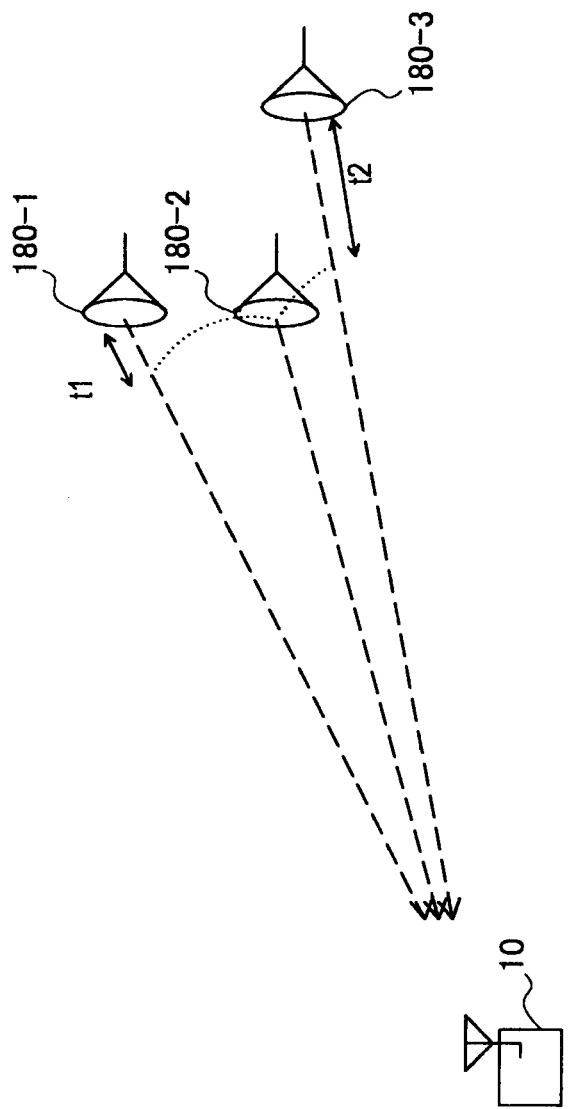
FIG. 8 is an explanatory view to describe control of directionality of sonic waves with use of three speakers.

In the case where the arrival directions of wireless signals are specified in a three-dimensional space by the three receiving antennas 110-1 to 110-3 as in the example of FIG. 7, it is preferred to output sonic waves from three speakers 180-1 to 180-3 as shown in FIG. 8. In this case, the sonic wave output unit 170 determines the amount of delay of a sound signal for each of the speakers 180-1 to 180-3 based on the arrival directions θ1 and θ2 of wireless signals that are determined by the determination unit 130, for example. In the example of FIG. 8, the amount of delay in the speaker 180-2 with respect to the speaker 180-1 is determined to be t1, and the amount of delay in the speaker 180-2 with respect to the speaker 180-3 is determined to be t2. Then, sonic waves are output from the respective speakers 180-1 to 180-3 according to the respective amounts of delay, so that directionality of sonic waves in a three-dimensional space can be oriented toward the direction of the signal source 10.

2-2-2 Control According to Location of Signal Source

Further, as a second pattern of directionality control, directionality of sonic waves that are output from the sonic wave output device 100 may be controlled according to the location of the signal source with use of three or more receiving antennas that receive wireless signals, by extending the above-described first pattern of directionality control.

Figure 9:
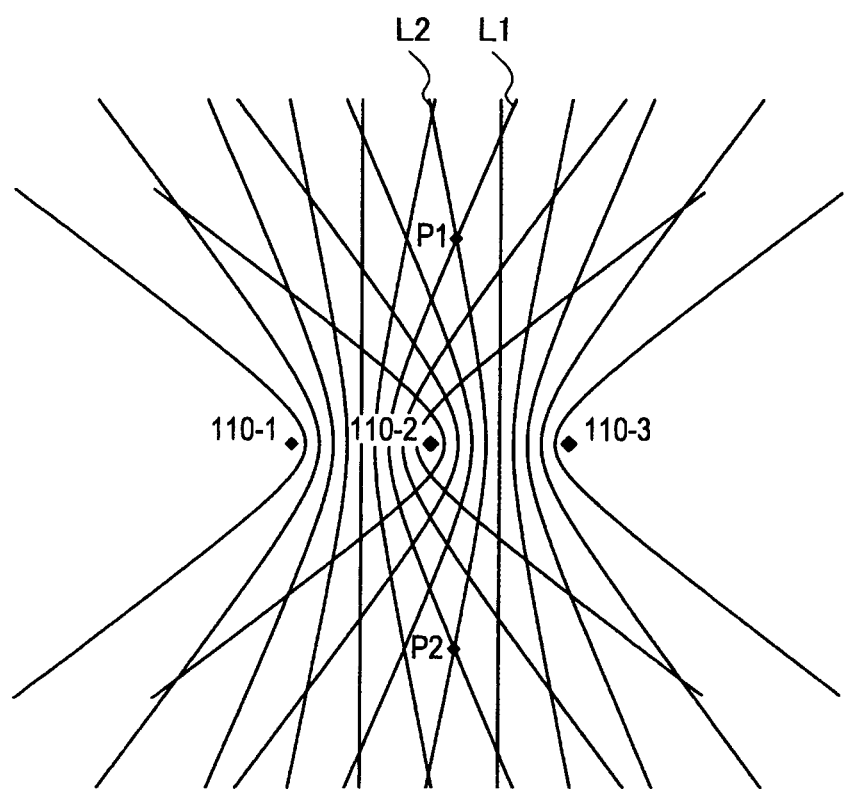
FIG. 9 is an explanatory view to describe processing of determining a location of a signal source.

For example, in the case where the third receiving antenna 110-3 is placed on the same plane as the signal source 10, the receiving antenna 110-1 and the receiving antenna 110-2, the determination unit 130 can specify the location of the signal source 10 on the plane as shown in FIG. 9. Specifically, the determination unit 130 first recognizes that the signal source 10 is located on the hyperbola L1 based on a difference in path length of wireless signals between the receiving antennas 110-1 and 110-2. The determination unit 130 then recognizes that the signal source 10 is located on the hyperbola L2 based on a difference in path length of wireless signals between the receiving antennas 110-2 and 110-3. The determination unit 130 can thereby determine that the signal source 10 is located at a point P1 or P2 of intersection between the hyperbolas L1 and L2. Whether the location of the signal source 10 is either P1 or P2 can be determined based on the installation conditions of the sonic wave output device 100 or the like, for example.

If the location of the signal source 10 is specified as in the example of FIG. 9, directionality of sonic waves may be oriented toward the direction of the signal source 10 with use of three speakers 180-1 to 180-3 as shown in FIG. 8, for example. Alternatively, directionality of sonic waves may be oriented toward the direction of the signal source 10 with use of one speaker 180 capable of mechanically controlling the orientation of a vibrating surface as shown in FIG. 10.

Figure 10:
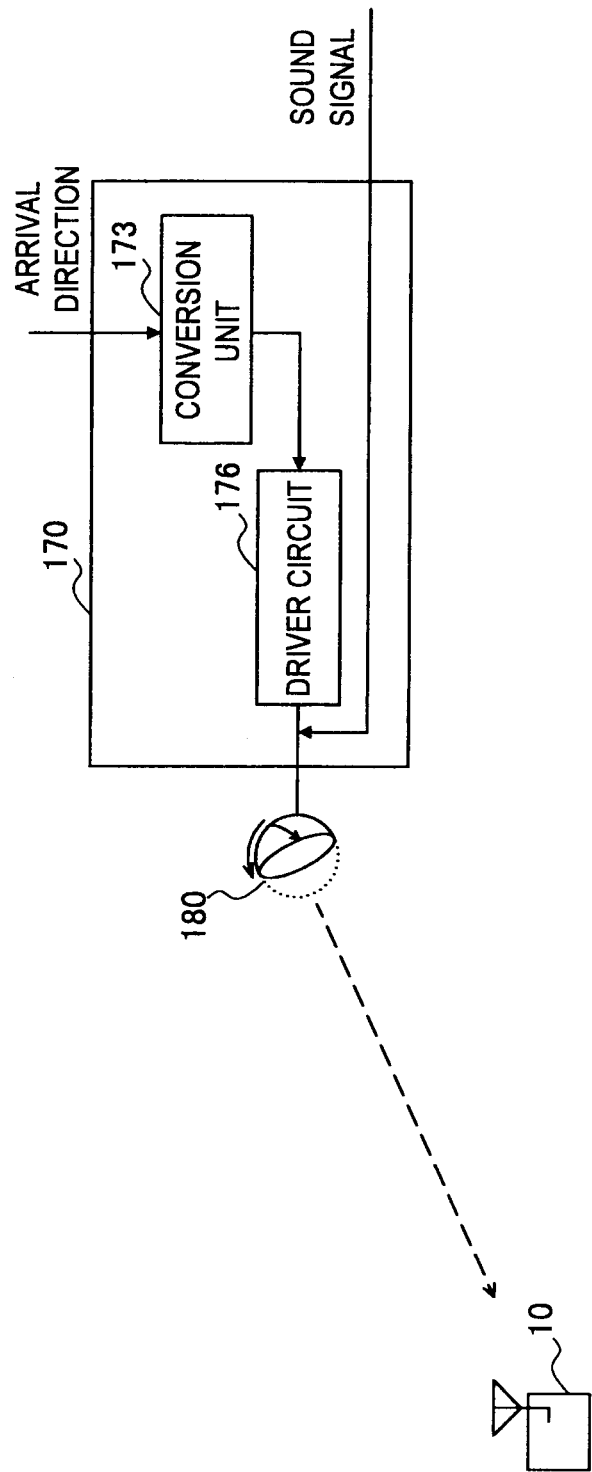
FIG. 10 is an explanatory view to describe control of directionality of sonic waves with use of a speaker that is controlled mechanically.

In the example of FIG. 10, the sonic wave output unit 170 includes a conversion unit 173 and a driver circuit 176. The conversion unit 173 converts the location of the signal source that is input from the determination unit 130 into the amount of drive for mechanically changing the orientation of a vibrating surface of the speaker 180 and inputs it to the driver circuit 176. The driver circuit 176 then changes the orientation of a vibrating surface of the speaker 180 according to the input amount of drive. Directionality of sonic waves output from the speaker 180 is thereby oriented toward the direction of the signal source 10.

Further, the location of the signal source 10 may be specified in a three-dimensional space with use of four or more receiving antennas.

2-2-3 Control According to Phase Delay

As a third pattern of directionality control, if the speakers 180-1 to 180-m are placed in close proximity to the receiving antennas 110-1 to 110-n, respectively, the above-described processing of calculating the arrival directions of wireless signals or the location of the signal source 10 can be omitted. For example, it is assumed that two receiving antennas and two speakers are mounted. In such a case, the following relational expression is established between the difference d in path length between the two receiving antennas and the amount of delay t of sonic wave output between the two speakers when the velocity of sound is v:

Expression 3

$$t = \frac{d}{v} \qquad (3)$$

By combining Expressions (1) and (3) or Expressions (2) and (3), it is possible to calculate the amount of delay to be applied to the speaker without calculating the arrival directions of wireless signals or the location of the signal source 10. Making use of such an idea, in the case where three receiving antennas and three speakers are mounted, the determination unit 130 can determine the amount of delay for each speaker with inverting the order of the arrival time or phase of wireless signals of the receiving antennas. A circuit scale is thereby reduced, and improvement of response is expected by a decrease in calculation costs.

Figure 11:
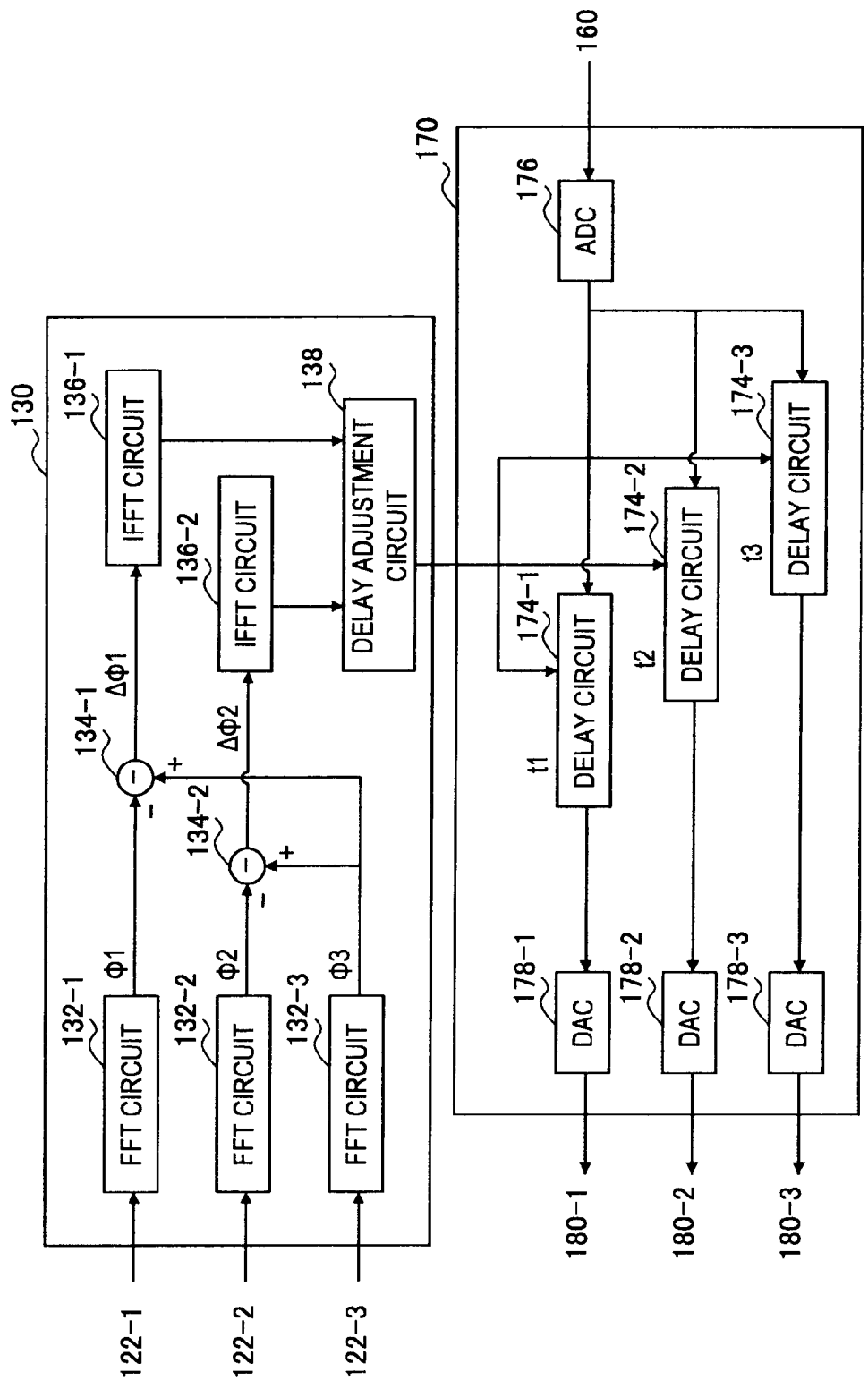
FIG. 11 is a block diagram showing a specific configuration for achieving a third pattern of directionality control.

FIG. 11 is a block diagram showing specific configurations of the determination unit 130 and the sonic wave output unit 170 for achieving the third pattern of directionality control. It is assumed in this example that three receiving antennas and three speakers are mounted to the sonic wave output device 100.

Referring to FIG. 11, the determination unit 130 includes FFT circuits 132-1 to 132-3 corresponding to the number of receiving antennas 110 (and the corresponding wireless receiving units 122), subtractors 134-1 and 134-2, IFFT circuits 136-1 and 136-2, and a delay adjustment circuit 138. Meanwhile, the sonic wave output unit 170 includes delay circuits 174-1 to 174-3, an ADC (Analog to Digital Converter) 176, and DACs (Digital to Analog Converters) 178-1 to 178-3.

In the determination unit 130, the FFT circuits 132-1 to 132-3 perform fast Fourier transform of respective received signals and thereby convert time-domain signals contained in the received signals into frequency-domain signals. Certain frequency components φ1, φ2 and φ3 that are contained in beacon signals transmitted from the signal source 10 are thereby extracted. Next, the subtractor 134-1 calculates a phase difference Δφ1 between the frequency component φ1 and the frequency component φ3. Further, the subtractor 134-2 calculates a phase difference Δφ2 between the frequency component φ2 and the frequency component φ3. Then, the IFFT circuit 136-1 performs inverted fast Fourier transform of the phase difference Δφ1 and thereby converts it into a time-domain signal. Likewise, the IFFT circuit 136-2 performs inverted fast Fourier transform of the phase difference $\Delta\phi2$ and thereby converts it into a time-domain signal.

The delay adjustment circuit 138 inverts the order of the relative phase delay of the wireless signals in each of the receiving antennas 110-1 to 110-3 calculated as above and determines the amount of delay for each of the speakers 180-1 to 180-3.

For example, it is assumed that the phases of wireless signals that are received at the same window timing are delayed in such a way that a phase corresponding to time $\tau1$ is delayed in the receiving antenna 110-1 and a phase corresponding to time $\tau2$ ($\tau1 > \tau2$) is delayed in the receiving antenna 110-2, each with respect to the receiving antenna 110-3. Thus, in this case, the wireless signals are received in the order of the antenna 110-3, the antenna 110-2 and the antenna 110-1. Then, the delay adjustment circuit 138 determines the amount of delay of the speaker 180-2 as $t2=\tau1-\tau2$ and the amount of delay of the speaker 180-3 as $t3=\tau1$, with respect to the amount of delay of the speaker 180-1 as $t1=0$. Accordingly, sonic waves are output in the order of the speaker 180-1, the speaker 180-2 and the speaker 180-3.

The amounts of delay t1, t2 and t3 that are determined in this manner are respectively output from the delay adjustment circuit 138 to the delay circuits 174-1 to 174-3 of the sonic wave output unit 170. Then, when a sound signal that is converted from analog to digital by the ADC 176 is input to each of the delay circuits 174-1 to 174-3, the sound signal is delayed by the amounts of delay t1, t2 and t3, respectively, and output to the corresponding DACs 178-1 to 178-3. The delayed sound signals are then converted from digital to analog by the DACs 178-1 to 178-3 and output from the speakers 180-1 to 180-3.

Although a phase delay of wireless signals is calculated in the determination unit 130 by using the subtractors 134-1 and 134-2 in the example of FIG. 11, a phase delay may be calculated by a product on a polar coordinate plane instead. Further, delay filters with filter characteristics in a branch as the basis represented as a delta function in which only a center tap is one may be used as the delay circuits 174-1 to 174-3. Further, an equalizer that adjusts the amplitude of the respective frequency components may be added to the circuit of FIG. 11. Furthermore, the arrangement of the speakers is not limited to an array. The speakers may be arranged in any positions in a three-dimensional space.

2-2-4. Alternative Example

In the case where wireless signals are infrared rays, a lens for collecting infrared rays and a plurality of photoreceptors for receiving the collected infrared rays may be mounted to the receiving unit 120, rather than mounting the receiving antennas 110-1 to 110-$n$ to the receiving unit 120, and the location of the signal source 10 may be determined according to a position of a photoreceptor which has received a infrared ray on a receiving surface. For example, in the case where the signal source 10 is a remote control device as shown in FIG. 3 and a remote control signal is an infrared signal, an existing remote control device can be used as it is as the signal source 10 by using such a configuration.

The sonic wave output device 100 according to the first embodiment of the present invention is described in the foregoing with reference to FIGS. 4 to 11. In the sonic wave output device 100, a parameter value such as arrival directions of wireless signals which depends on the location of the signal source 10 is determined using wireless signals transmitted from the signal source 10. Based on the parameter value, sonic waves having directionality oriented toward the direction of the signal source 10 are output. It is thereby possible to output sonic waves with directionality toward a target located in an arbitrary direction or place which is not limited in advance.

3. Description of Second Embodiment

A sonic wave output device 200 according to a second embodiment of the present invention, which is described hereinafter, further identifies an individual piece of the signal source 10 or a user who holds the signal source 10 by using an identifier that is contained in wireless signals and controls whether to output sonic waves according to the identification result.

[3-1 Structure of Beacon]

Figure 12:
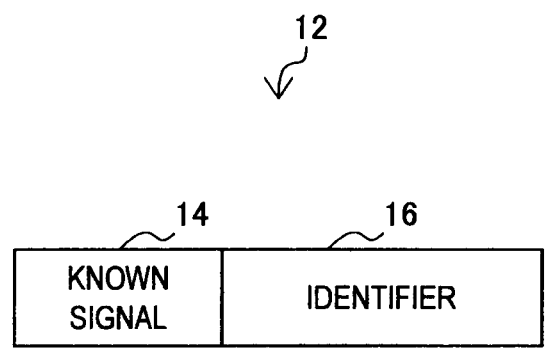
FIG. 12 is an explanatory view showing an example of a structure of a beacon transmitted from a signal source.

In the second embodiment of the present invention, the signal source 10 operates as a beacon transmitter that transmits a beacon as shown in FIG. 12, for example. A beacon that is transmitted from the signal source 10 may be a packet signal, a control signal being an infrared ray or an electromagnetic wave emitted from a remote control device, an IC tag in RFID (Radio Frequency IDentification) technology or the like, for example.

FIG. 12 shows an example of a signal format of a beacon 12 that can be transmitted from the signal source 10. The beacon 12 contains a known signal 14 in the first half and an identifier 16 in the latter half. The known signal 14 has a certain signal pattern which is known to the sonic wave output device 200 that receives the beacon 12. Specifically, the sonic wave output device 200, which is described later, compares a signal pattern of a received signal with a signal pattern of the known signal 14 that is prestored inside and thereby detects that it has received the beacon 12. Further, the known signal 14 may be used for calculation of an arrival time difference or a phase difference of the beacon 12 between receiving antennas by the sonic wave output device 200.

Meanwhile, the identifier 16 is an identifier for identifying an individual piece of the signal source 10 or a user who holds the signal source 10. The identifier 16 is used for control of sonic wave output by the sonic wave output device 200.

[3-2. Configuration of Sonic Wave Output Device]

Figure 13:
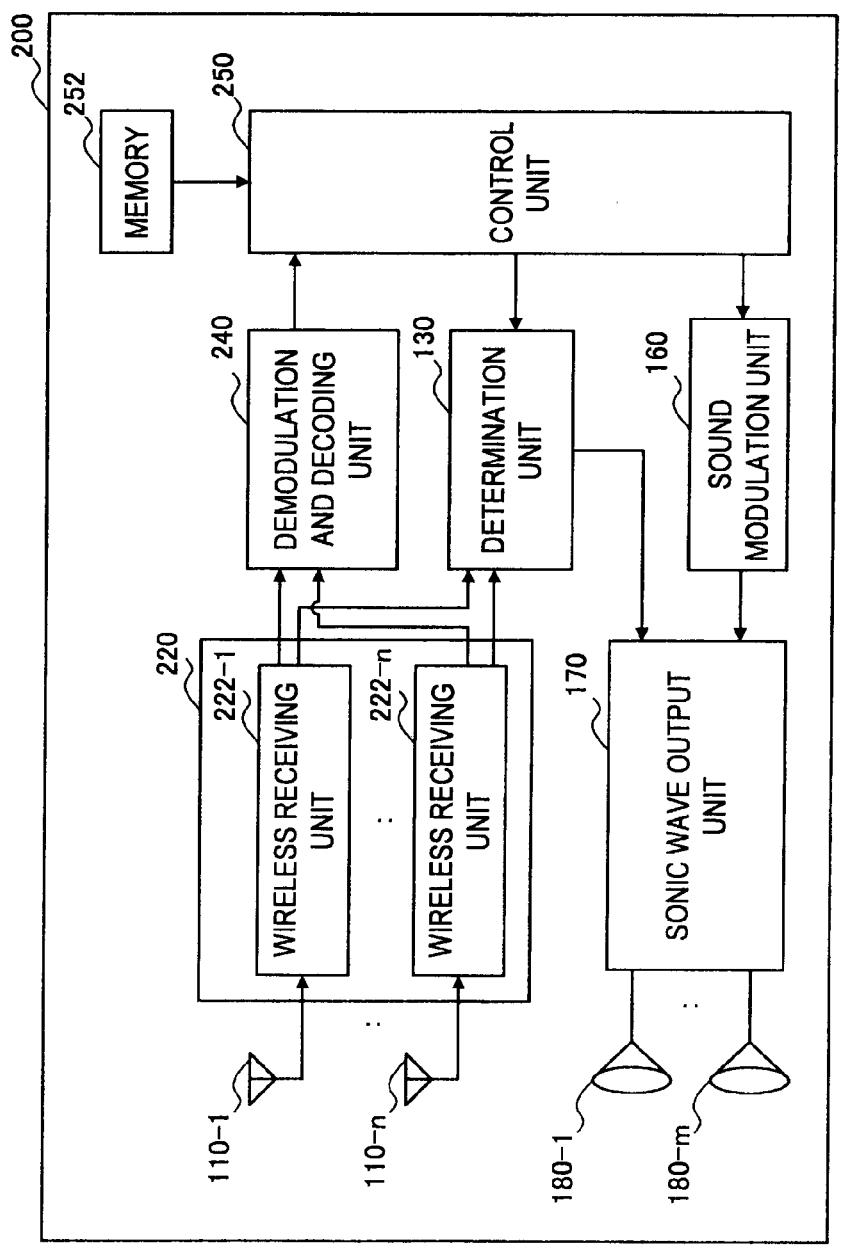
FIG. 13 is a block diagram showing an example of a configuration of a sonic wave output device according to a second embodiment.

FIG. 13 is a block diagram showing an example of a configuration of the sonic wave output device 200 according to the embodiment.

Referring to FIG. 13, the sonic wave output device 200 includes receiving antennas 110-1 to 110-$n$, a receiving unit 220, a determination unit 130, a demodulation and decoding unit 240, a control unit 250, memory 252, a sound modulation unit 160, a sonic wave output unit 170, and speakers 180-1 to 180-$m$. The receiving unit 220 includes wireless receiving units 222-1 to 222-$n$ respectively corresponding to the n-number of receiving antennas 110-1 to 110-$n$.

In this embodiment, the wireless receiving units 222-1 to 222-$n$ receive wireless signals transmitted from the signal source 10 through the corresponding receiving antennas 110-1 to 110-$n$. Then, the respective wireless receiving units 222-1 to 222-$n$ amplify the received signals, perform AD conversion, and output the converted signals to the determination unit 130 and the demodulation and decoding unit 240.

The demodulation and decoding unit 240 modulates the received signals input from the respective wireless receiving units 222-1 to 222-$n$ according to a given modulation method such as phase modulation, amplitude modulation or a combination or those, and further decodes the received signals according to a given decoding method. The demodulation and decoding unit 240 then outputs the decoded received signals to the control unit 250.

If the signal pattern of the known signal 14, an example of which is shown in FIG. 12, is detected from the received signal, the control unit 250 determines whether the signal source 10 is a target of sonic wave output by referring to the identifier 16 that is received after the known signal 14. If it is determined that the signal source 10 is a target of sonic wave output, the control unit 250 instructs the determination unit 130 to determine a parameter value depending on the location of the signal source 10 and outputs a sound signal to the sound modulation unit 160. The detection of the signal pattern of the known signal 14 from the received signal may be performed in any processing block of the receiving unit 220, the demodulation and decoding unit 240 or the control unit 250.

The identifier 16 of the target of sonic wave output may be previously recorded on the memory 252, for example. In the case of distributing the signal source 10 serving as a beacon transmitter to users who visit an exhibition venue and providing sound to explain an article on exhibition, for example, the identifier 16 for each signal source 10 may be recorded on the memory 252 of the sonic wave output device 200 in advance. Alternatively, the identifier 16 of a target of sonic wave output may be recorded on the memory 252 dynamically in response to a request from the signal source 10.

In the configuration of the sonic wave output device 200 described above, it is possible to set directionality of sonic waves to focus only toward the specific signal source 10 to be provided with sound from the sonic wave output device 200 even if a plurality of signal sources 10 of wireless signals exist in the vicinity of the sonic wave output device 200, for example.

4. Description of Third Embodiment

According to a third embodiment of the present invention, which is described hereinbelow, sound emitted by the user 20 who holds the signal source 10 (or the user 20 who is located in close proximity to the signal source 10) is collected by controlling directionality of a microphone with use of a parameter value determined from a received signal. Specifically, a voice communication device 300 that implements both sound output with directionality and sound input with directionality is configured in this embodiment.

Figure 14:
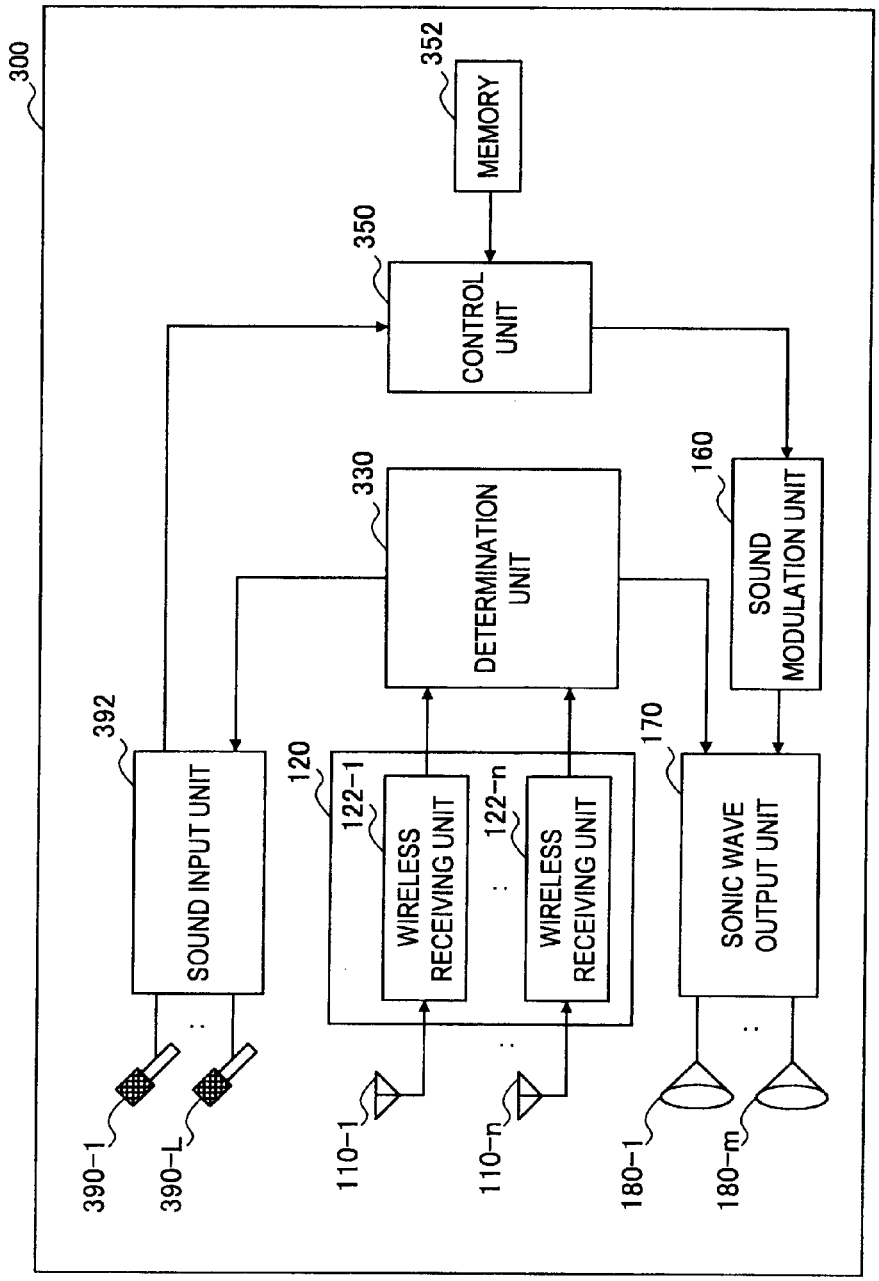
FIG. 14 is a block diagram showing an example of a configuration of a sonic wave output device according to a third embodiment.

FIG. 14 is a block diagram showing an example of a configuration of the voice communication device 300 according to the third embodiment of the present invention.

Referring to FIG. 14, the voice communication device 300 includes receiving antennas 110-1 to 110-$n$, a receiving unit 120, a determination unit 330, a control unit 350, memory 352, a sound modulation unit 160, a sonic wave output unit 170, speakers 180-1 to 180-$m$, microphones 390-1 to 390-L (L≥1), and a sound input unit 392.

In this embodiment, the determination unit 330, just like the determination unit 130 according to the first embodiment, determines a parameter value that varies depending on the location of the signal source 10, such as arrival directions of wireless signals, the location of the signal source 10 or the amount of delay for each of the speakers 180-1 to 180-$m$, from a received signal. The determination unit 330 then outputs the determined parameter value to the sonic wave output unit 170 and the sound input unit 392.

The microphones 390-1 to 390-L may be L-number of microphones arranged in an array, for example. Alternatively, the microphones 390-1 to 390-L may be one microphone capable of collecting sound with directionality, such as a shotgun microphone, for example. The microphones 390-1 to 390-L sets its directionality to focus toward the signal source 10 according to control by the sound input unit 392.

The sound input unit 392 sets directionality of the microphones 390-1 to 390-L to focus toward the direction of the signal source 10 according to any of the above-described parameter values that is input from the determination unit 330. The sound input unit 392 then amplifies sound collected through the microphones 390-1 to 390-L, performs AD conversion and outputs the sound to the control unit 350.

The control unit 350 executes a program stored in the memory 352 with use of a control device such as a CPU or an MPU, for example, and controls the operation of the voice communication device 300 as a whole. Specifically, the control unit 350 offers a conversation function to a user of the voice communication device 300 by sound collected through the microphones 390-1 to 390-L and sound output through the speakers 180-1 to 180-$m$. The memory 352 stores a program executed by the control unit 350, control data or the like with use of semiconductor memory such as ROM, for example.

In the configuration of the voice communication device 300 described above, directionality of the speakers 180-1 to 180-$m$ and the microphones 390-1 to 390-L is oriented toward the direction of the signal source 10 according to a parameter value that is determined by the determination unit 330. The user 20 shown in FIG. 2, for example, can thereby perform conversation without holding the voice communication device 300 (the sonic wave output device 100$b$ in FIG. 2) with the hand.

In this embodiment, if a wireless signal received by the receiving unit 120 is sonic waves, the sonic waves may be received by using the microphones 390-1 to 390-L instead of the receiving antennas 110-1 to 110-$n$.

5. Description of Fourth Embodiment

According to a fourth embodiment of the present invention, which is described hereinbelow, sound collected by using microphones is analyzed, and output of sonic waves is controlled according to the analysis result.

Figure 15:
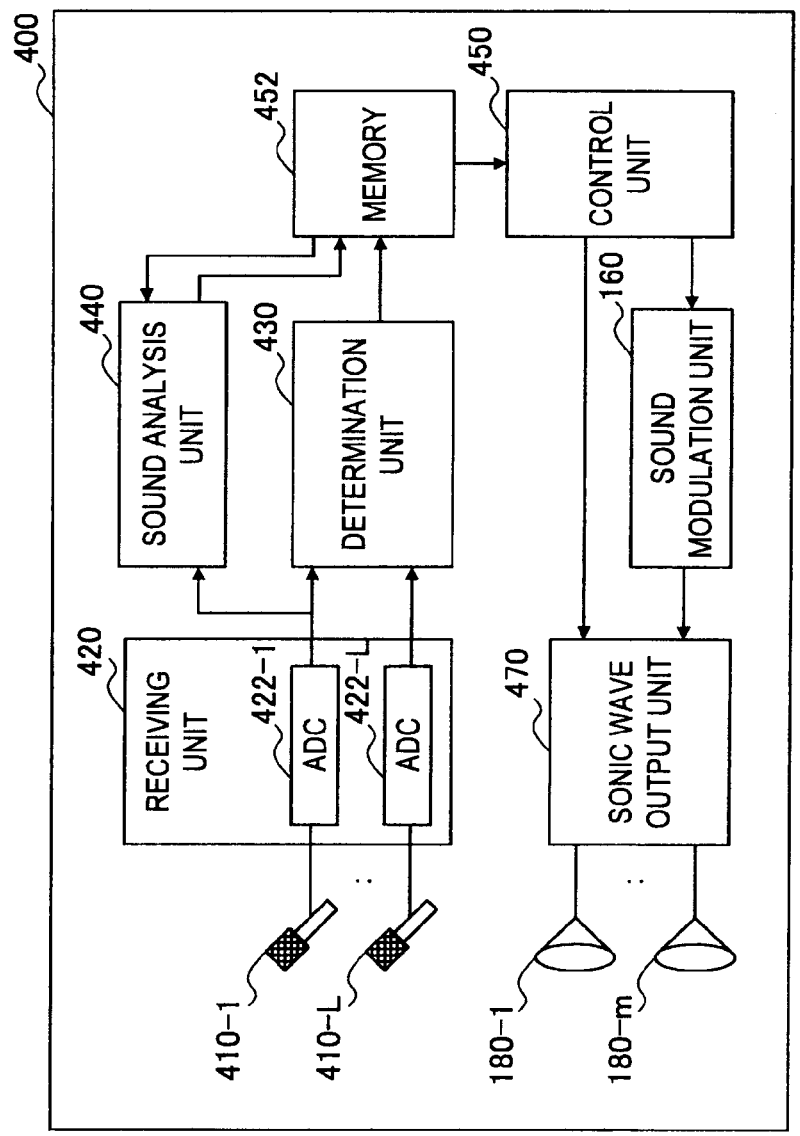
FIG. 15 is a block diagram showing an example of a configuration of a sonic wave output device according to a fourth embodiment.

FIG. 15 is a block diagram showing an example of a configuration of a sonic wave output device 400 according to a fourth embodiment of the present invention.

Referring to FIG. 15, the sonic wave output device 400 includes microphones 410-1 to 410-L, a receiving unit 420, a determination unit 430, a sound analysis unit 440, a control unit 450, memory 452, a sound modulation unit 160, a sonic wave output unit 470 and speakers 180-1 to 180-$m$. The receiving unit 420 includes ADCs 422-1 to 422-L respectively corresponding to the microphones 410-1 to 410-L.

In this embodiment, the microphones 410-1 to 410-L collect sound emitted from the direction of the signal source 10, for example, and output the sound to the corresponding ADCs 422-1 to 422-L of the receiving unit 420. The ADCs 422-1 to 422-L of the receiving unit 420 perform AD conversion of the sound input from the corresponding microphones 410-1 to 410-L to generate sound signals and output the sound signals to the determination unit 430 and the sound analysis unit 440.

The determination unit 430, just like the determination unit 130 according to the first embodiment, determines a parameter value such as arrival directions of sound signals, the location of the signal source 10 or the amount of delay for each of the speakers 180-1 to 180-$m$ from the input sound signals. The determination unit 330 then stores the determined parameter value into the memory 452.

Meanwhile, the sound analysis unit 440 verifies a waveform of the sound signal input from the receiving unit 420 against a known waveform of voice of each user that is prestored in the memory 452 and thereby specifies a user who is speaking, which is a speaker. The sound analysis unit 440 then outputs an identifier that identifies the specified speaker to the memory 452, so that it is stored in association with the above-described parameter value determined by the determination unit 430.

If the identifier of a user to be provided with sound and a sound signal to be provided are input from an application (not shown) for sound provision, for example, the control unit 450 first acquires the parameter value associated with the identifier from the memory 452. The control unit 450 then outputs the sound signal to the sound modulation unit 160 and further outputs the acquired parameter value to the sonic wave output unit 470.

The sonic wave output unit 470 controls directionality of the speakers 180-1 to 180-$m$ based on the parameter value that is input from the control unit 450, and outputs the sound signal modulated by the sound modulation unit 160 as sonic waves from the speakers 180-1 to 180-$m$.

In the configuration of the sonic wave output device 400 described above, it is possible to set directionality of sonic waves to focus only toward the specific signal source 10 or user 20 to be provided with sound even if a plurality of signal sources 10 or users 20 exist in the vicinity of the sonic wave output device 400, for example.

The sound analysis unit 440 may further analyze the contents of what is sounded out from a waveform of the sound signal input from the receiving unit 420 and detect a voice command that is associated with a specific word or phrase. Therefore, the sonic wave output device 400 can output sonic waves with directionality oriented toward a relevant user 20 only when a predefined specific voice command is emitted from the user 20, for example.

6. Summary

The sonic wave output devices 100, 200, 400 and the voice communication device 300 according to the four embodiments of the present invention are described in the foregoing with reference to FIGS. 4 to 15.

In the devices described above, sonic waves having directionality oriented toward the direction of the signal source 10 are output based on a parameter value depending on the location of the signal source 10 that is determined by using wireless signals transmitted from the signal source 10. It is thereby possible to output sonic waves appropriately with directionality toward a target located in an arbitrary direction or place which is not limited in advance. Therefore, even if the user 20 who holds the signal source 10 moves, for example, it is possible to adjust directionality of sonic waves according to the movement. Further, in a use such as explanation of an article on exhibition, it is possible to allow a user to listen to sound for explanation without designating the location of the user in advance.

Further, because a parameter value for controlling directionality of sonic waves to be output can be calculated at small calculation costs from an arrival time difference or a phase difference of wireless signals, it is possible to reduce a circuit scale used for directionality control.

Furthermore, an identifier may be contained in a beacon transmitted from the signal source 10, so that directionality of sonic waves can be oriented only toward a specific user that is identified by the identifier.

In addition, by incorporating a microphone capable of focusing directionality toward the direction of the signal source 10 based on the above-described parameter value, it is feasible to achieve a hands-free voice communication device.

A series of processing described in this specification may be implemented by hardware or software. In the case of executing a series of or a part of processing by software, a program constituting the software is prestored in ROM, loaded to RAM upon execution and then executed by a CPU.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-326032 filed in the Japan Patent Office on Dec. 22, 2008, the entire content of which is hereby incorporated by reference.

What is claimed is:

1. A sonic wave output device comprising:
   a receiving unit configured to receive wireless signals transmitted from a certain signal source, wherein the receiving unit includes a plurality of receiving antennas to receive the wireless signals;
   a sonic wave output unit comprising a plurality of speakers, each configured to output a sonic wave with a certain amount of delay, the sonic waves having directionality toward toward a direction of the signal source; and
   a determination unit configured to determine the amount of delay for each of the speakers according to an arrival time difference or a phase difference of the wireless signals between the receiving antennas.

2. The sonic wave output device according to claim 1, wherein
   the determination unit is further configured to determine the direction of the signal source based on the arrival time difference or the phase difference of the wireless signals between the receiving antennas, and to determine the amount of delay for each of the speakers based on the direction of the signal source.

3. The sonic wave output device according to claim 1, wherein
   the receiving unit includes three or more receiving antennas to receive the wireless signals, and
   the determination unit is further configured to determine a location of the signal source according to two or more arrival time differences or phase differences of the wireless signals between the receiving antennas.

4. The sonic wave output device according to claim 1, wherein
   the speakers of the sonic wave output unit are respectively mounted in close proximity to the receiving antennas of the receiving unit, and
   the determination unit is configured to determine the amount of delay for each of the speakers with inverting an order of arrival time or phase of the wireless signals of the receiving antennas.

5. The sonic wave output device according to claim 4, wherein
   the wireless signals are beacons containing an identifier for identifying an individual piece of the signal source or a user holding the signal source, and
   the sonic wave output device further includes a control unit configured to control whether to output sonic waves from the sonic wave output unit according to the identifier contained in the beacons.

6. The sonic wave output device according to claim 1, further comprising:
a sound analysis unit configured to specify a user being a speaker of sound from known users based on the sound collected from the direction of the signal source.

7. The sonic wave output device according to claim 1, further comprising:
a control unit configured to control output of sonic waves from the sonic wave output unit according to whether a specific voice command is contained in sound collected from the direction of the signal source.

8. The sonic wave output device according to claim 1, wherein
the receiving unit includes a plurality of photoreceptors configured to receive infrared rays as the wireless signals, and
the determination unit is further configured to determine a location of the signal source according to a position of a photoreceptor having received the infrared ray.

9. A voice communication device comprising:
a receiving unit configured to receive wireless signals transmitted from a certain signal source, wherein the receiving unit includes a plurality of receiving antennas to receive the wireless signals;
a sonic wave output unit comprising a plurality of speakers, each configured to output a sonic wave with a certain amount of delay, the sonic waves having directionality toward a direction of the signal source;
a determination unit configured to determine the amount of delay for each of the speakers, according to an arrival time difference or a phase difference of the wireless signals between the receiving antennas; and
a sound input unit configured to collect sound from the direction of the signal source based on the arrival time difference or the phase difference of the wireless signals between the receiving antennas.

10. A sonic wave output method comprising the steps of:
receiving, with a plurality of receiving antennas, wireless signals transmitted from a certain signal source;
determining an amount of delay for each of a plurality of speakers, according to an arrival time difference or a phase difference of the wireless signals between the receiving antennas; and
outputting, with the plurality of speakers, sonic waves with directionality toward a direction of the signal source, wherein each speaker is configured to output a sonic wave with the determined amount of delay.

11. A non-transitory computer-readable medium that stores a set of instructions that are executable by at least one processor to perform a sonic wave output method, the method comprising:
receiving, with a plurality of receiving antennas, wireless signals transmitted from a certain signal source;
determining an amount of delay for each of a plurality of speakers, according to an arrival time difference or a phase difference of the wireless signals between the receiving antennas; and
outputting, with the plurality of speakers, sonic waves with directionality toward a direction of the signal source, wherein each speaker is configured to output a sonic wave with the determined amount of delay.

* * * * *